(12) United States Patent
Leonhardt et al.

(10) Patent No.: US 6,480,351 B2
(45) Date of Patent: *Nov. 12, 2002

(54) OPTICAL SERVO SYSTEM FOR A TAPE DRIVE

(75) Inventors: Michael Lawrence Leonhardt, Longmont; Scott David Wilson, Westminster, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/775,893

(22) Filed: Feb. 5, 2001

(65) Prior Publication Data

US 2001/0006437 A1 Jul. 5, 2001

Related U.S. Application Data

(63) Continuation of application No. 09/577,017, filed on May 22, 2000, now Pat. No. 6,236,529, which is a continuation of application No. 08/980,723, filed on Dec. 1, 1997, now Pat. No. 6,084,740.

(51) Int. Cl.$^7$ .............................. G11B 5/584; G11B 7/00
(52) U.S. Cl. ........................ 360/77.12; 360/75; 369/97
(58) Field of Search ................................ 360/77.12, 75, 360/77.03, 78.02, 78.11; 369/44.11, 44.14, 44.17, 97

(56) References Cited

U.S. PATENT DOCUMENTS

| | | |
|---|---|---|
| 3,426,337 A | 2/1969 | Black et al. |
| 3,997,715 A | 12/1976 | Elliott |
| 4,176,381 A | * 11/1979 | De Niet et al. ........... 360/77.12 |
| 4,275,425 A | * 6/1981 | Watanabe et al. ............. 360/92 |
| 4,340,305 A | 7/1982 | Smith et al. ................. 356/356 |
| 4,380,032 A | 4/1983 | Pfost .......................... 360/74.6 |
| 4,570,191 A | 2/1986 | DiStefano et al. |
| 4,816,939 A | 3/1989 | Ford et al. ................ 360/77.03 |

(List continued on next page.)

FOREIGN PATENT DOCUMENTS

| | | | |
|---|---|---|---|
| DE | 34 17 426 | 11/1985 | |
| EP | 0 257 713 A2 | 3/1988 | |
| EP | 0 311 859 | 4/1989 | |
| EP | 0 344 759 A2 | 12/1989 | |
| EP | 0 496 461 | 7/1992 | |
| EP | 0 549 845 A1 | 7/1993 | |
| EP | 0 555 511 A1 | 8/1993 | |
| GB | 1 595 136 | 8/1983 | |
| JP | 56-111169 | * 9/1981 | |
| JP | 6-20414 | * 1/1994 | .............. 360/77.03 |
| WO | 94/12975 | 6/1994 | |

OTHER PUBLICATIONS

Jim Godwin, "An Introduction to the Insite 325 Floptical Disk Drive," SPIE vol. 1078 Optical Data Storage Topical Meeting, 1989, pp. 71–79.*

(List continued on next page.)

*Primary Examiner*—Andrew L. Sniezek
*Assistant Examiner*—Mitchell Slavitt
(74) *Attorney, Agent, or Firm*—Wayne P. Bailey

(57) ABSTRACT

The optical servo system for a tape drive that functions to align a read/write head with the data tracks written on a recording surface of a tape by reading optical servo tracks that are formed on the back side of the tape. This process decouples the magnetic recording of data on the recording surface of the tape from the optical servo system which makes use of servo tracks formed on the back side of the tape. The data storage capacity of the tape is increased since the entire recording surface of the tape is filled with data tracks and the precise alignment of the read/write head makes it possible to place the data tracks closer together. Regions of contrasting reflectivity or phase are also provided on a surface of the read/write head to enable the optical servo system to view an image of both the read/write head and the entire back side of the tape to thereby align the movable read/write head with the data tracks.

5 Claims, 4 Drawing Sheets

U.S. PATENT DOCUMENTS

| | | | |
|---|---|---|---|
| 4,816,941 A | * 3/1989 | Edel et al. | 360/77.05 X |
| 4,958,245 A | 9/1990 | Roth et al. | 360/77.03 |
| 4,961,123 A | 10/1990 | Williams et al. | |
| 4,969,058 A | 11/1990 | Williams et al. | 360/77.03 |
| 5,038,030 A | * 8/1991 | Hayashi et al. | 250/225 |
| 5,065,387 A | 11/1991 | Roth et al. | |
| 5,067,039 A | 11/1991 | Godwin et al. | 360/77.03 X |
| 5,196,969 A | 3/1993 | Iwamatsu et al. | 360/78.02 X |
| 5,218,595 A | 6/1993 | Lehureau et al. | |
| 5,279,775 A | 1/1994 | Thomas et al. | |
| 5,283,773 A | 2/1994 | Thomas et al. | |
| 5,319,507 A | 6/1994 | Umebayashi et al. | |
| 5,333,091 A | 7/1994 | Iggulden et al. | 396/55 |
| 5,349,484 A | 9/1994 | Koehler | 360/77.12 |
| 5,462,823 A | 10/1995 | Evans et al. | |
| 5,515,212 A | 5/1996 | Chiao et al. | |
| 5,535,069 A | 7/1996 | Chiao et al. | 360/77.03 |
| 5,563,868 A | 10/1996 | Farnsworth et al. | |
| 5,566,033 A | 10/1996 | Frame et al. | 360/74.6 |
| 5,877,910 A | 3/1999 | Williams et al. | 360/77.03 X |
| 6,084,740 A | 7/2000 | Leonhardt et al. | 360/78.02 |
| 6,246,535 B1 | 6/2001 | Saliba et al. | |

OTHER PUBLICATIONS

Aug. 1, 1990, "Spacial Filtering For Storage," IBM Technical Disclosure Bulletin, vol. 33 (No. 3A), pp. 191–193.

Mar. 10, 1978, A.S. Hoagland, "Optical Servo Of Magnetic Recording," IBM Technical Disclosure Bulletin, vol. 20 (No. 10), pp. 4808–4109.

U.S. Patent Application Serial No. 09/046,723, Filed Mar. 24, 1998, Saliba, et al.

* cited by examiner

OPTICAL SERVO SYSTEM FOR A TAPE DRIVE

This is a continuation of application Ser. No. 09/577,017 filed on May 22, 2000, now U.S. Pat. No. 6,236,529 which is a continuation of Ser. No. 08/980,723 filed on Dec. 1, 1997 now U.S. Pat. No. 6,084,740.

FIELD OF THE INVENTION

The present invention relates to servo systems for use with tape media and, in particular, to a servo system that makes use of optical tracking features formed on the back side of the tape to enable the system to precisely align the read/write heads with the recorded data located on the front side of the tape.

PROBLEM

It is a problem in the field of tape data storage media to accurately position the read/write heads with respect to the tracks of data written on the tape. In longitudinal tape media, the tape typically contains a single recording surface on which is written along the length of the tape a plurality of parallel aligned tracks of data. In systems using high track densities (>200 tracks per inch), the precise alignment of these data tracks with the read/write heads of the associated tape drive is accomplished by the use of a plurality of servo tracks written on the tape recording surface, interspersed with the tracks of data. The servo tracks, typically written during the tape manufacturing process, function as a physical reference for the placement of the data tracks when the data tracks are written on the tape and for reading previously written data tracks from the tape. The position information derived from the servo tracks is used by the tape drive to adjust the position of the movable read/write head to enable the accurate reading and writing of data to and from the data tracks.

A problem with this tracking system is that the number of data tracks written on the tape is limited by the need for servo tracks written on the recording surface to provide position information. There is a need to facilitate the development and use of future tape systems with increased data capacity. This is often accomplished by the increase in the number of data tracks and the amount of data placed in a given track. Due to the mechanical instability of tape media, higher data track densities require a decreased physical spacing between data and servo tracks to ensure the accurate alignment of the read/write heads with the data tracks. The decreased spacing drives the need for increased numbers of servo tracks which, in turn, must share the tape area with data tracks. Furthermore, it is highly desirable for future systems to retain the ability to read the tapes made on earlier systems—this is termed "backward compatibility". This backward compatibility requires the head positioning servos to be able to work on tapes with varying numbers of tracks and track configurations. This presents a design challenge and can force future drive designs to trade off between performance enhancements and backward compatibility. A further problem is that magnetically written servo tracks are susceptible to track erasure. Bulk erasure of the tape can erase servo tracks, drive system failure can result in the servo tracks being overwritten and corrupted—either of which can render the tape and its data useless.

There are numerous servo track systems in use in the field of rewritable data storage media. Some of these are illustrated by the disclosures of the following patents.

U.S. Pat. No. 4,958,245, titled "Apparatus And Method For Optical Servo Control With Media Having Information Storage And Servo Control Regions Of Different Reflectivities" discloses an optical servo head to read position information from a disk on which data is magnetically recorded. The disk has a plurality of optical servo tracks formed thereon in the form of relatively nonreflective regions comprising concentric grooves formed in the reflective surface of the magnetic disk. The servo system illuminates a plurality of the reflective and non-reflective regions and uses a quadrature photodetector array to achieve tracking.

U.S. Pat. No. 5,067,039 titled "High Track Density Magnetic Media With Pitted Optical Servo Tracks And Method For Stamping The Tracks On The Media" discloses a method for mechanically stamping the servo tracks on the optical disk during the disk manufacturing process.

U.S. Pat. No. 5,279,775 titled "Acousto-Optic Intensity Control Of Laser Beam During Etching Of Optical Servo Information Of Magnetic Media" discloses a system that etches servo tracks on a magnetic disk. Track following during the etching process is accomplished by the use of an acoustic-optical device to maintain the beam in concentric patterns, while a laser beam is used to etch the servo tracks, with the laser beam intensity being controlled by the acoustic-optical device U.S. Pat. No. 5,283,773 titled "Steering Laser Beam While Etching Optical Servo Tracks For Magnetic Disks" discloses a system that etches servo tracks on a magnetic disk. Track following during the etching process is accomplished by the use of an acoustic-optical device to maintain the beam in concentric patterns, while a laser beam is used to etch the servo tracks U.S. Pat. No. 5,462,823, titled "Magnetic Recording Materials Provided With A Photosensitive Layer" discloses a magnetic recording element that comprises a support layer coated with a magnetic recording layer and a photosensitive layer. Optical tracking information is formed on the photosensitive layer by the exposure of the photoreactive surface using a servo track mask.

The above noted servo systems all make use of servo tracks that are formed on the rewritable media on the same surface as is used to store the data. The servo information is typically in the form of servo tracks that are formed coextensive with the data tracks and interspersed among the data tracks. Therefore, the servo tracks occupy space on the tape that can be used for the storage of data. Furthermore, there is an inherent interaction between the use of servo tracks and the writing of data tracks such that the system cannot optimize the data recording function without impacting on the servo function. Conversely, the system can not optimize the servo function without impacting the data recording function.

SOLUTION

The above described problems are solved and a technical advance achieved by the present optical servo system for a tape drive that functions to align a read/write head with the data tracks written on a recording surface of a tape by reading optical servo tracks that are formed on the back side of the tape. This process decouples the magnetic recording of data on the recording surface of the tape from the optical servo system which makes use of servo tracks formed on the back side of the tape to position the read/write head. For example, the recording formats of the data can be altered and the number of data tracks can be changed without impacting the optical servo system. The servo system can accommodate a wide range of recording format changes within its signal processing algorithms without modifying its servo tracks. In addition, the data storage capacity of the tape is increased since the entire recording surface of the tape is filled with data tracks and precise alignment of the read/write head with the data tracks makes it possible to place the data tracks closer together.

The tape used in this system has magnetic data tracks recorded on the front side of the tape and optical servo tracks, comprising regions of differing reflectivity or phase, formed on the back side of the tape. Although current magnetic media types could be utilized, the servo track reading and writing processes explained below are optimized by the use of a media with a second side optically tuned to have high contrast or phase change at the read rumination wavelength and high write sensitivity at the servo track writing wavelength. A magnetic read/write head that is positioned juxtaposed to the front side of the tape reads data from and writes data to the data tracks while the optical servo system reads servo data from the servo tracks that are formed on the back side of the tape. The requirement for close data track-to-servo track spacing is met by having the servo tracks located immediately behind the data tracks. Regions of contrasting reflectivity or phase are also provided on a surface of the read/write head to enable the optical servo system to view an image of both the read/write head and the entire back side of the tape to thereby align the movable read/write head with the data tracks. The head's optical features may be formed by numerous means known to those familiar with the art including integration into the head structure itself or affixing a secondary structure to a head surface. An optical sensor array generates electrical signals indicative of the received image which are then used by a digital signal processor to determine the required alignment of the read/write head with the data tracks. Once the proper alignment is determined, the digital signal processor generates a position error signal that in turn is fed to the servo amplifier which drives an actuator to align the movable read/write head with the data tracks.

The use of the two sources of optical data from the read/write head and the tape media improves the accuracy, performance and reliability of the data track to read/write head alignment while simplifying the entire servo system. Using this approach, all optical components can be fixed in place. Since the servo system "closes the loop" around the tape and head optical feature alignment, system alignment and calibration requirements are eased. Fault tolerance to damaged tape and/or head optical features is facilitated by the availability of redundant optical information—a plurality of optical features exist on both the tape and the head. Furthermore, because this system locates the entire width of the tape with respect to the head, servo information is always available to quickly re-establish head-to-tape alignment (i.e. "track following") should it be lost during drive operations. Interchange, the ability to read a given tape on a population of tape drives, is facilitated by the servo system's ability to image the mechanical relationship between tape and head immediately after the tape is loaded into the drive and make appropriate offset adjustments in the head's static position. The immediate availability of this offset information results in a reduced tape load time. This reduction, in turn, results in higher overall job throughput for the drive in a repetitive tape loading environment—such as is commonly seen when robots are used to mount and dismount tapes in the drive.

The optical servo tracks are not subject to magnetic erasure. Accidental magnetic damage is eliminated thus increasing data recovery reliability. Bulk magnetic erasure of the tapes facilitates their reuse by reducing old data noise sources, improving data security by eliminating old data and providing an economic benefit over new tapes.

DETAILED DESCRIPTION

The present optical servo system for a tape drive operates with a tape that has data tracks written on a recording surface (first side) of the tape and optical servo tracks formed on the back side (second side) of the tape. An optical servo system reads the servo tracks on the second side of the tape and optical features on the read/write head to determine the alignment between a read/write head with data tracks on the first side of the magnetic tape. The digital signal processor generates control signals indicative of the adjustments needed to align the read/write head with the data tracks, the head actuator responds to the amplified signals and moves the read/write head to the desired position.

Optical Servo System For A Tape Drive

Figure 1:
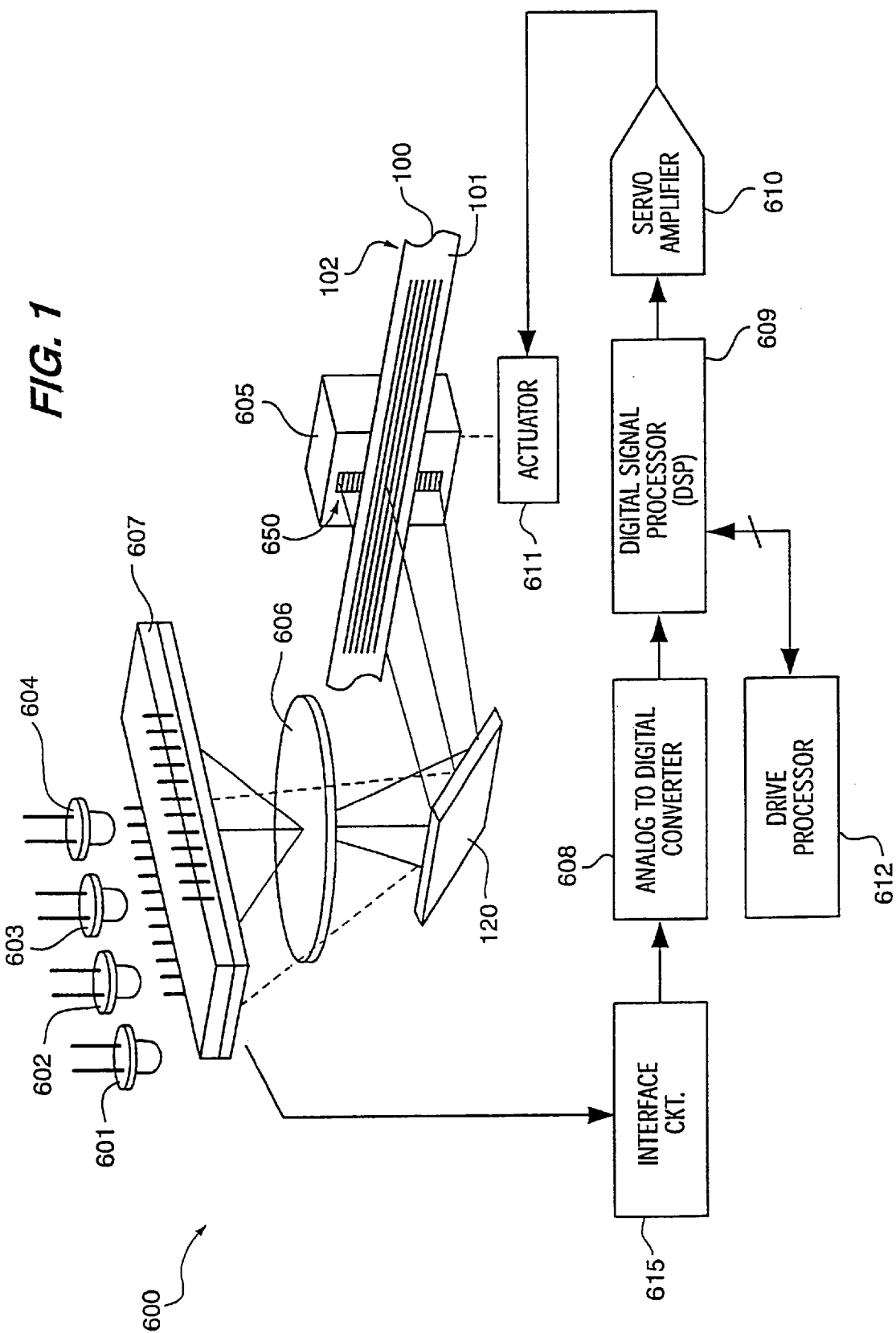
FIG. 1 illustrates in block diagram form the present optical servo system for a tape drive.
Figure 4:
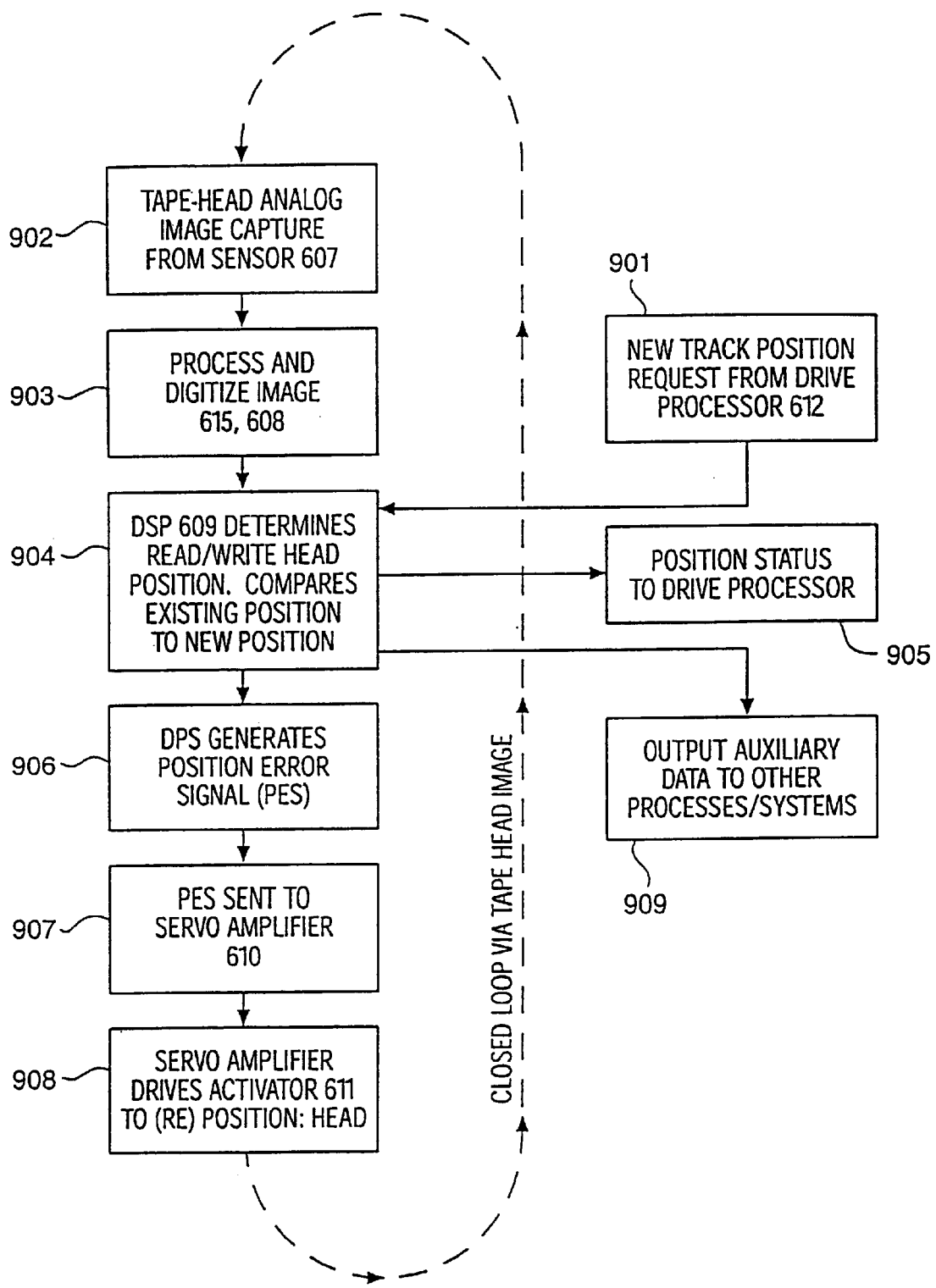
FIG. 4 illustrates in flow diagram form the operation of the present optical servo system for a tape drive.

FIG. 1 illustrates in block diagram form the present optical servo system for a tape drive 600 and FIG. 4 illustrates in flow diagram form the operation of this system. The present optical servo system for a tape drive 600 operates to align tape 100 and read/write head 605 of the tape drive as tape 100 passes over read/write head 605. The remaining mechanical elements of the tape drive are not illustrated herein for the purpose of simplicity of description. The read/write head 605 is movable and its position is determined by actuator 611, which operates under control of the present optical servo system for a tape drive 600 as directed by the drive processor 612. The tape 100, for the purpose of this description, is a magnetic tape that has a recording surface on a first side 102 and a second side 101 that is used for positioning information. This process begins with the drive processor 612 issuing a track position request at step 901.

The tape 100 has formed on the second side 101 thereof a plurality of parallel aligned servo tracks 110 that are used to precisely identify the position of the data tracks written on the first side 102 of the tape 100. The optical servo system for a tape drive 600 reads one or more of the servo tracks 110 at the point that tape 100 is directly over read/write head's optical features 650. This is accomplished by the Light Emitting Diodes (LEDs) 601–604 each generating a beam of light that is directed onto tape 100 and read/write head 605 by mirror 120. The servo tracks 110 formed on the second side 101 of tape 100 represent areas of differing reflectivity or phase and the image of the second side 101 of tape 100 and the optical features 650 on the face of the read/write head 605 extending beyond tape 100 is reflected back onto mirror 120. This reflected image is directed by mirror 120 through lens 606 onto sensor array 607. Sensor array 607 is an imaging device, such as a linear Charge Coupled Device (CCD) imaging array, that functions to capture the reflected image and convert the reflected image into an electrical signals at step 902. The generated electrical signal, indicative of the image content, is transmitted to interface circuit 615, which produces an analog signal that is transmitted to an analog to digital converter 608 to create a digital representation of the image at step 903. A digital signal processor 609 receives this digital representation of the image and algorithmically determines the alignment of the read/write head 605 with the data tracks from the digital image at step 904. The digital signal processor 609 compares this current head position alignment with the drive processor's requested position from step 901 and then determines the direction and the distance that the read/write head 605 must be moved to meet the new position request. The digital signal processor 609 at step 906 generates a position error control signal that defines this movement and transmits the signal to a servo amplifier 610 at step 907 to control the operation of actuator 611 to move the read/write head 605 in the direction needed to align the movable read/write head 605 with the data tracks at step 908.

While the read/write head 605 approaches the desired track position, the sensor array 607 continues to periodically update the tape-head image. This image signal is sent through processing blocks 615, 608 to the digital signal processor 609. The digital signal processor 609 makes a new determination of read/write head alignment then reduces its position error signal to the servo amplifier 610 accordingly to slow the actuator's movement of the head. This sampling process (steps 902–908) repeats itself until the head is in the desired position. At this point, the system "track follows" by continuing to detect small misalignments between the head and the desired track and signaling the actuator 611 to make corrections to the head's position to keep it precisely aligned (while still continuing to repeat steps 902–908). This process continues until a new request (step 901) is received from drive processor 612 to move to a new track position. The drive processor's new position request is compared by the digital signal processor 609 (at step 904) to the current read/write head position and a new position error signal is generated (at step 906) and sent to the servo amplifier 610 (step 907). The actuator 611 begins to move the read/write head 605 (step 908) while the sensor array 607 allows the servo system to monitor progress toward achieving the new head position by periodically updating the tape-head image. The image is sent through processing blocks 615, 608 to the digital signal processor 609, where the position error signal is updated—this process repeats until the new head position is attained and track following begins (steps 902–908).

As is known in the art, for fastest performance, the actuator's acceleration is dependent upon the distance it is required to travel—large repositioning creates the largest acceleration/deceleration. Small track following re-positioning results in the smallest acceleration/ decelerations and the greatest positional precision. In addition, the configuration disclosed herein is illustrative of the inventive concept and other optical configurations are well within the design capabilities of one skilled in the art.

Image Content

Figure 2:
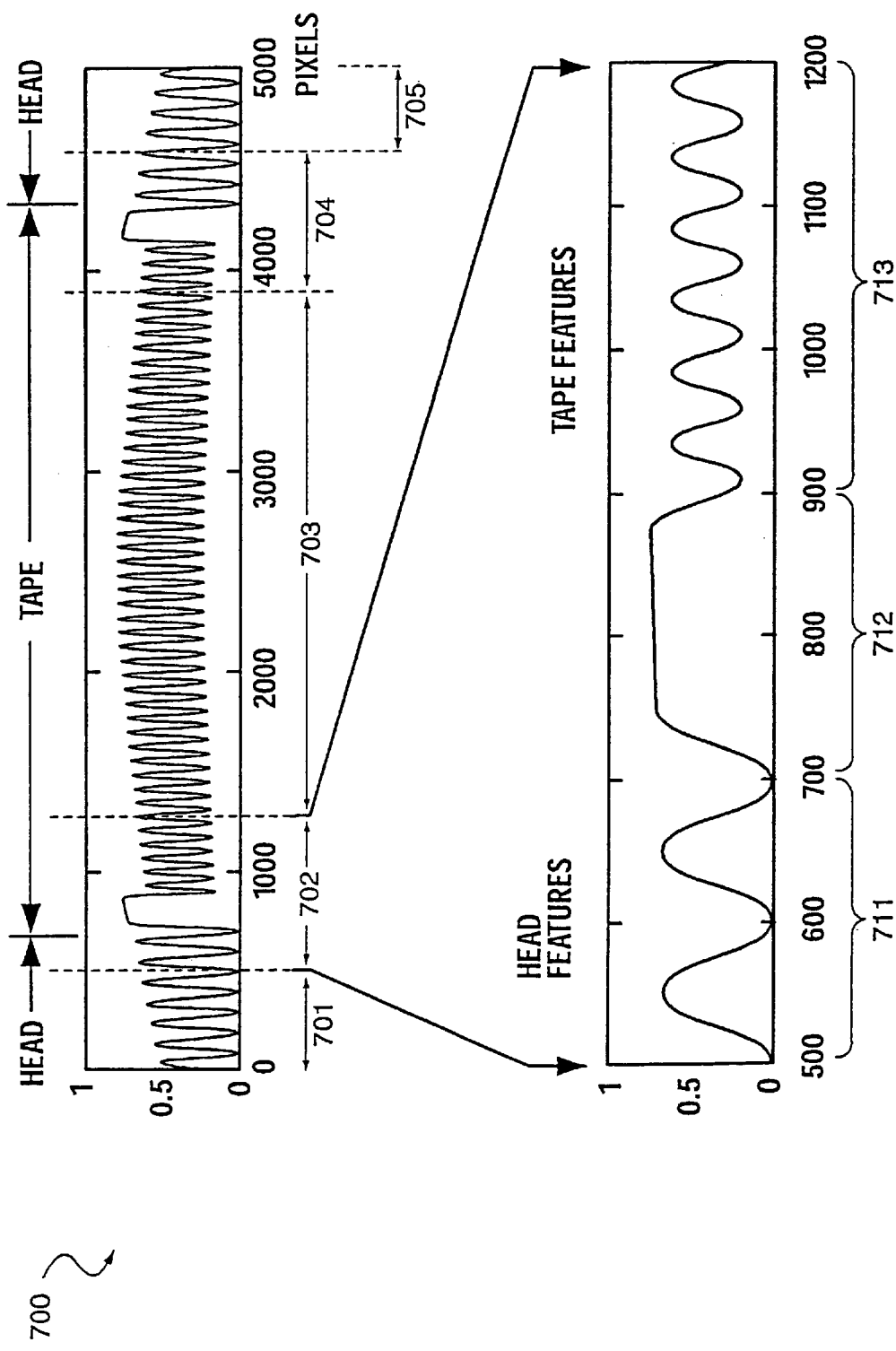
FIG. 2 illustrates the waveform signal output from the image system of the present optical servo system for a tape drive.

An example of the image 700 captured by the present optical servo system for a tape drive 600 is illustrated in FIG. 2. Image 700 represents a sample of all of the pixels that are generated by sensor array 607. For the purpose of illustration, the image size is selected to be 5,000 pixels, with the horizontal axis of the diagram of FIG. 2 representing the individual pixels, and the vertical axis representing the signal magnitude of the selected pixel. The diagram also includes notations along the top of the pixel chart to indicate the typical extent of the tape 100 in the image 700. In addition, the image 700 is divided into five regions: read/write head image 701, boundary between read/write head and tape image 702, tape image 703, boundary between read/write head and tape image 704, read/write head image 705. These various regions are individually discussed below.

Areas 701 and 705 are region of the read/write head image and comprise approximately the first and last 500 pixels of image 700. The variations in signal strength illustrated by the continuous curve of FIG. 2 represents the presence of the contrasting markings 650 located on the surface of read/write head 605. Since the read/write head 605 is the sole source of this portion of the image, the variations are regular and map to the contrasting markings 650. Areas 702 and 704 represent the boundary between read/write head and tape image. An expanded view of area 702 illustrates the image received from the edge of tape 100. Within area 702, from about pixel 500 to about pixel 700, the contrasting regions are from the contrasting markings 650 located on the surface of read/write head 605 near the edge of tape 100. Region 712, from about pixel 700 to approximately pixel 900, indicates the edge region of tape 100 that does not contain optical data. Area 713 from approximately pixel 900 to approximately pixel 1200 has intermittent regions of high and low reflectivity or phase. In this example, the regions of low reflectivity indicate individual tracks of the servo track group 110. Finally, area 703 includes pixels from approximately pixel 1200 through approximately pixel 3800 and is an image of contrasting reflectivities or phases representing the servo tracks 110 formed on the second side 101 of tape 100.

Method of Aligning

Applying conventional pattern recognition methods to image data from step 903, the digital signal processor 609 calculates the position error signal 906 by first establishing accurate measurements of the relative positions, in pixels, of the optical features found on the magnetic head and tape. Because of the tracking accuracy required by the tape drive may be more stringent than the pixel-to-pixel resolution in the image data, sub-pixel measurement accuracy is needed. This accuracy is achieved by averaging the contributions to a given position measurement from as many features in the image data as possible. The digital signal processor 609 must utilize all of the image data for the magnetic head optical features, 701 and 705, to yield an accurate measurement of the magnetic head position. Similarly, many optical tracks 703 must be read and the data averaged to obtain an accurate measurement of a given magnetic track on tape. One method of utilizing all the data in an image subset is to use the correlation algorithm where an image subset is compared to a reference signal stored in memory. The resulting correlation coefficient indicates a best fit when the reference signal is optimally aligned with the image subset. The reference signals can be based on typical signals experienced by many such tape drives and stored in non-volatile memory or can be based on actual signals obtained by a given tape drive during initial machine calibration or periodic re-calibrations between tape loads.

Once the optical features are adequately determined, the magnetic head position is calculated by interpolation from those features, 701 and 705. The magnetic track position is computed from the position of a plurality of the closest optical servo tracks from the set 703. The position error signal sent to the servo amplifier 610 at step 907 is the difference between the calculated magnetic head position and the desired magnetic track position.

Additional Features

The optical servo system for a tape drive 600 can provide additional capabilities beyond the provision of read/write head positioning information. Auxiliary information formed on the second side 101 of tape 100 can include encryption/authentication data, tape identification data or even maintenance information and read only data. For example, reflectivity or phase parameters can be recorded on tape 100 to indicate the initial state of tape 100 as well as manufacturing data. The optical servo system for a tape drive 600 can then measure the present optical characteristics of tape 100 to thereby obtain a measure of the wear on tape 100. Furthermore, optical servo system for a tape drive 600 can view the image or read/write head 605 in its entirety between loads of tape 100 to verify head integrity and identify any optical feature defects.

The servo tracks 110 can perform a simple read/write head positioning function or can be coded to provide data relating to longitudinal positioning of tape 100 to enable high speed searching of tape 100, which data can also be used for tape velocity determination. This auxiliary information is encoded into the servo tracks during the servo track writing process using modulation that can be separated out from the basic servo signals by the digital signal processor 609. The auxiliary information is then supplied to other drive or system processes in step 909.

Servo Track Write System

Figure 3:
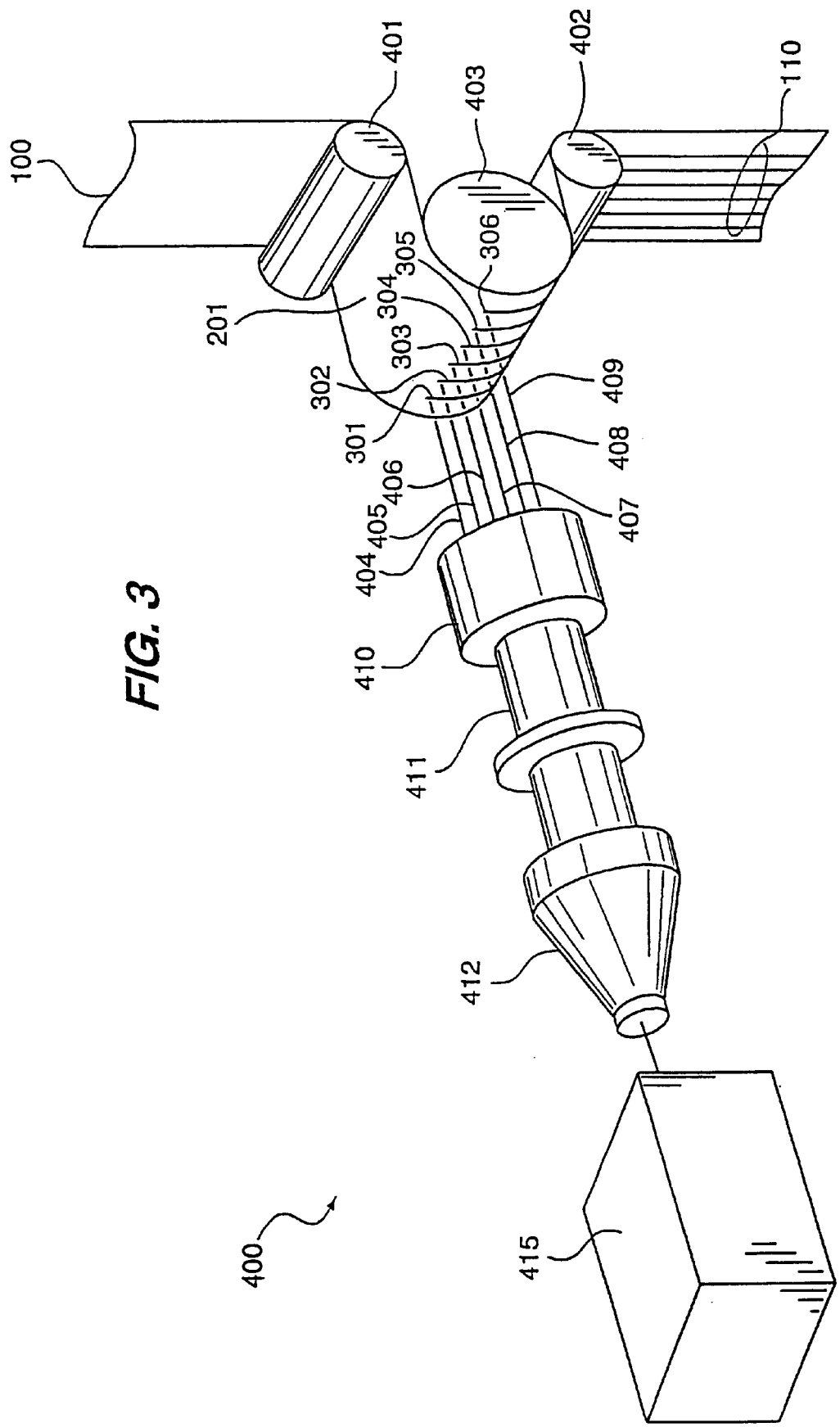
FIG. 3 illustrates in block diagram form the system for forming the servo tracks on the tape for use by the present optical servo system for a tape drive.

A system for writing optical servo tracks 400 on tape 100 is illustrated in FIG. 3. The system for writing optical servo tracks 400 writes the set of optical servo tracks 110 in one pass of tape 100 through the system for writing optical servo tracks 400. The system for writing optical servo tracks 400 includes a laser 415 that focuses a beam of light into beam expander 412. The expanded beam output by beam expander 412 is extended through hologram 411 which splits the beam into a plurality of individual beams 404–409, which are focused onto tape 100 by lens 410. The exact number of beams is a design choice. However, the accuracy of the alignment of the read/write head 605 and the second side 101 of tape 100 improves as the number of optical servo tracks 110 increases. Therefore, it is desirable to place as many servo tracks 301–306 on tape 100 as possible. Increasing the number of servo tracks to be simultaneously written on the media is facilitated by the use of media whose second side 101 is optically tuned to laser 415's wavelength. The plurality of beams 404–409 forms parallel aligned, optical servo tracks 301–306 onto the second side 101 of tape 100 as tape 100 is passed under the beams 404–409. Rollers 401–403 move tape 100 under the focused beams 404–409 at a constant speed on the second side 101 of tape 100 to ensure that the optical servo tracks 110 have the same consistency.

The laser beams 404–409 can be used to write auxiliary data on the servo tracks 110 by programming laser 415 to intermittently extinguish. The intermittent extinguishing (modulation) of the beam causes the servo optical tracks 110 to be written intermittently in a specified pattern on side 101 of tape 100. This auxiliary data can be used by the present invention to determine tape speed, alignment, defect detection and other attributes of the tape being read, as noted above. In the alternative, a plurality of lasers can be used to write the optical servo tracks. The lasers could also be of different intensities to change the reflectivity or phase of individual tracks or the beams from the lasers can be of varying widths to change the width of the formed servo tracks to allow recognition of different sections of tape.

What is claimed is:

1. A method of aligning a head with a storage media, comprising the steps of:
    reading at least one optical feature reflected from the storage media;
    reading at least one optical feature reflected from the head; and
    aligning the head to the storage media based upon the at least one optical feature reflected from the storage media and the at least one optical feature relected from the head.

2. A system for aligning a head with at least one of a plurality of data tracks written on a first side of a data storage media as said media passes over said head, wherein said media also includes optical servo features formed on a second side of said media, said system comprising:
    an optical circuit that detects at least a portion of said optical servo features reflected from said second side of said media;
    an electrical circuit, operatively coupled to said optical circuit, that aligns said head with said at least one of a plurality of data tracks in response to said detected optical servo fields; and
    a media drive, wherein the head is moveable attached to the media drive, and wherein the optical circuit comprises an optical sensor that is fixedly attached to the media drive.

3. In a tape drive, a system for aligning a read/write head, that is moveably attached to said tape drive, with a selected set of a plurality of data tracks written on a first side of a tape as said tape passes over said read/write head, wherein said tape also includes optical servo features formed on a second side of said tape, said system comprising:
    an optical sensor fixedly attached to said tape drive that detects at least a portion of said optical servo features reflected from said second side of said tape; and
    an electrical circuit, operatively coupled to said optical circuit, that aligns said read/write head with said selected set of a plurality of data tracks on said first side of said tape in response to said detected optical servo features.

4. A tape library comprising a plurality of tape drives, at least a portion of said tape drives comprising:
    means for reading at least one optical feature reflected from the storage media;
    means for reading at least one optical feature reflected from the head; and
    means for aligning the head to the storage media based upon the at least one optical feature reflected from the storage media and the at least one optical feature reflected from the head.

5. In a tape library comprising a plurality of tape drives, at least a portion of said tape drives operable for aligning a head with a storage media and comprising the steps of:
    reading at least one optical feature reflected from the storage media;
    reading at least one optical feature reflected from the head; and
    aligning the head to the storage media based upon the at least one optical feature reflected from the storage media and the at least one optical feature reflected from the head.

* * * * *